(12) United States Patent
Dahl

(10) Patent No.: US 7,558,085 B2
(45) Date of Patent: Jul. 7, 2009

(54) POWER CONVERTER WITH AN ADJUSTABLE OUTPUT CABLE

(75) Inventor: Soren Risgaard Dahl, Odense SV (DK)

(73) Assignee: Illinois Tool Works Inc., Glenview, IL (US)

( * ) Notice: Subject to any disclaimer, the term of this patent is extended or adjusted under 35 U.S.C. 154(b) by 455 days.

(21) Appl. No.: 11/386,165

(22) Filed: Mar. 22, 2006

(65) Prior Publication Data
US 2006/0220468 A1     Oct. 5, 2006

(51) Int. Cl.
*H02J 3/00*     (2006.01)
(52) U.S. Cl. ......................................... 363/34
(58) Field of Classification Search .................. 363/34, 363/37; 307/98, 102, 151, 154; 361/601, 361/622, 679, 728–730; 439/13, 14, 534
See application file for complete search history.

(56) References Cited

U.S. PATENT DOCUMENTS 5,358,190 A     10/1994   Fladung
6,109,957 A     8/2000    Fladung
6,125,048 A *   9/2000    Loughran et al. ............. 363/78
6,628,014 B2    9/2003    Borup
6,849,962 B2 *  2/2005    McCool ...................... 290/1 R

FOREIGN PATENT DOCUMENTS

EP    0841804    5/1998
EP    1 278 284  1/2003

* cited by examiner

*Primary Examiner*—Matthew V Nguyen
(74) *Attorney, Agent, or Firm*—Fletcher Yoder

(57) ABSTRACT

The present invention relates to a power converter for supply of electrical power to an aircraft on the ground. More specifically it relates to a power converter comprising a housing enclosing a frequency converter for provision of a stabilized multi-phase alternating output voltage to an aircraft through an output cable that is supplied from a cable drum integrated in the housing and facilitating connection to aircrafts with variable distances between their power sockets and the converter.

17 Claims, 7 Drawing Sheets

POWER CONVERTER WITH AN ADJUSTABLE OUTPUT CABLE

BACKGROUND

Figure 1:
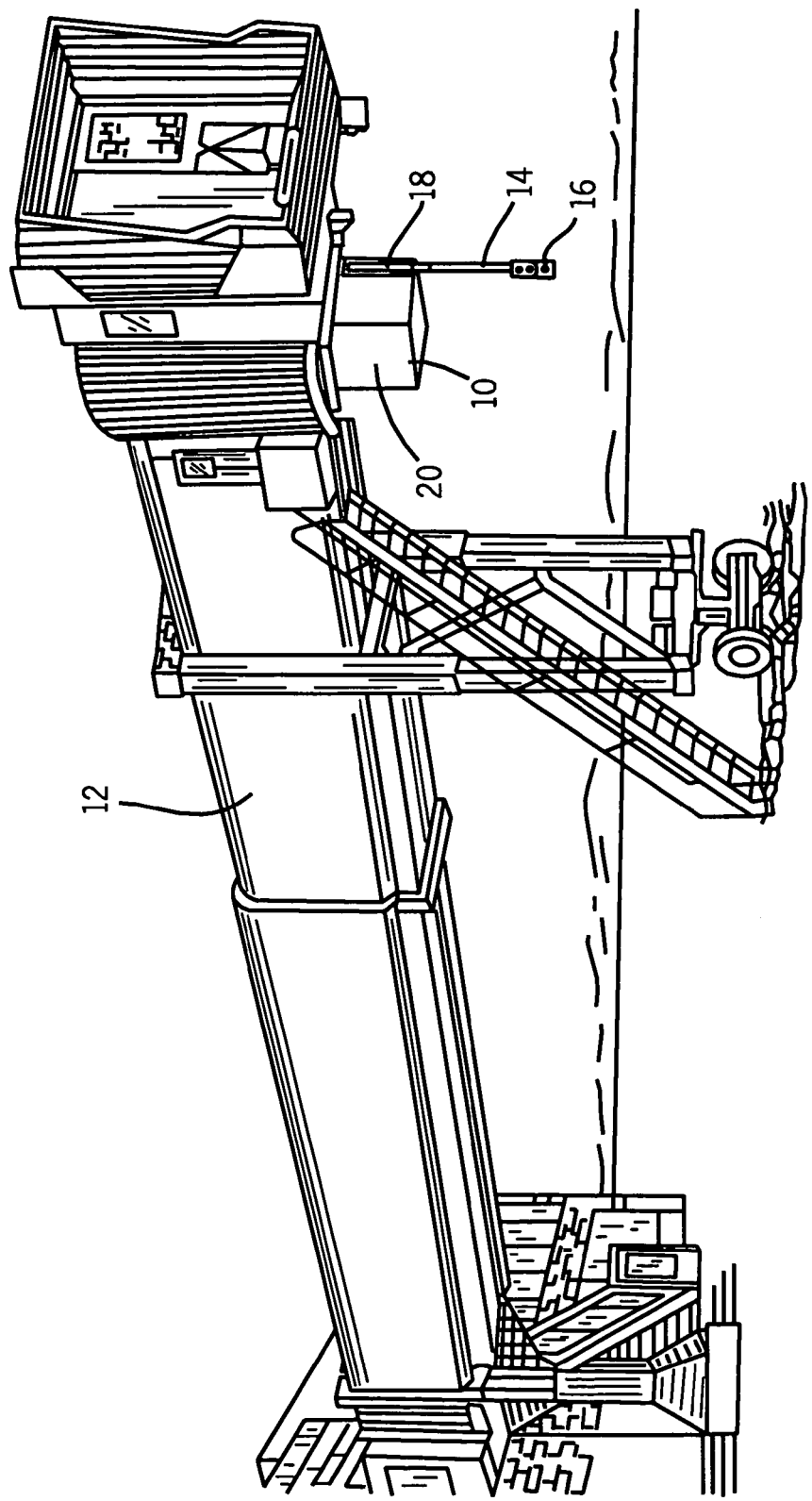

The present invention relates to a power converter for supply of electrical power to an aircraft on the ground. More specifically it relates to a power converter with a cable for connection of the output of the converter with the equipment to be supplied by the converter.

During flight, one or more generators tied to the output of the aircraft propulsion system generate the electrical power required in the aircraft. On the ground, however, a power converter that converts the line voltage available in the airport into the AC supply voltage required by the aircraft's electrical system is necessary.

Power converters of this type are well known. Typically, the units are driven by a 50 Hz or 60 Hz 3-phase input voltage and generates a desired 3-phase 400 Hz alternating output voltage.

The distance between a power converter and the power receptacle of a parked aircraft varies with different types of aircraft and actual parking positions and the positioning of the power converter. Typically, power cables of a length of 20 to 30 meters are required for interconnection of the aircraft with the power converter. Cable hoists, cable retrievers, and cable winders are known for interconnection between the aircraft and the power converter for provision of the desired length of power cable and for stowing the cable when it is not used.

The known units take up a significant amount of space underneath a passenger boarding bridge.

BRIEF DESCRIPTION

It is an object of the present invention to provide a power converter offering improved and simplified cable connection to the aircraft.

According to the present invention, the above-mentioned and other objects are fulfilled by a power converter comprising a housing with an input for a mains voltage of a mains frequency and enclosing a frequency converter for generation of a stabilized multi-phase alternating output voltage, wherein the converter further is connected with an output cable for supplying the output voltage to a load, such as an aircraft, the housing further enclosing a component holding the output cable and providing an adjustable length of the output cable allowing a variable distance between the load, e.g. an aircraft power socket, and the converter.

The mains supply available at airports is typically the mains supply generally available in the country of the airport, e.g. in Europe: 50 Hz, 400/230 $V_{rms}$ and 60 Hz, 460 $V_{rms}$ in USA. The output voltage is typically a 3-phase 400 Hz, 200/115 $V_{rms}$ output voltage.

The frequency converter may comprise a rectifier connected to the mains voltage for provision of a rectified DC voltage to the input of an inverter that generates the desired output voltage.

The output cable is provided with an aircraft connector for connection with a corresponding socket in the aircraft for supply of the output voltage to the aircraft while the other end of the cable is fixedly connected with the frequency converter output.

The output cable has at least one conductor for each phase of the converter output voltage and at least one neutral conductor. Further, a conductor for the interlock control signal is provided. The interlock control signal, typically a 28 $V_{DC}$ signal, is forwarded from the aircraft to the power converter and signals that the aircraft receives the required voltage quality. If the power converter does not receive the interlock signal, the power converter is turned off.

Conductors for other control signals may also be provided facilitating communication of information and control signals between the aircraft connector and the remaining part of the power converter. For example, the aircraft connector may be provided with a user panel comprising push buttons for entrance of user commands to the power converter.

In a preferred embodiment, the power converter further comprises a cable drum enclosed in its housing for winding and unwinding of the output cable for provision of the adjustable length of the output cable as measured between the cable connector and the power converter housing.

When the power converter is not in use, the output cable is wound onto the cable drum, and the cable is unwound from the cable drum when the output cable is pulled out from the power converter to be connected with an aircraft.

The winding and unwinding may be performed manually, or, the cable drum may be rotated with a motor. In one embodiment, the unwinding is performed manually while the winding is motor-driven.

The conductors of the output cable may be connected with corresponding outputs of the frequency converter by means of sliding contacts with one set of concentric sliding contacts attached to a stationary hub in the power converter housing and the corresponding set of concentric sliding contacts attached to the rotatable hub of the cable drum. One set of the sliding contacts may be spring biased against the other set. Alternatively, the cable drum may have one set of concentric sliding contacts that rotates with the drum and a corresponding set of respective stationary contact pins that are movable back and forth in the direction of the axis of rotation of the cable drum for connection with the respective concentric sliding contacts. Thus, the contact pins are moved back and separated from the sliding contacts when the cable drum is rotating and moved back into contact and pressed against the contact rings when the cable drum has reached a standstill. U.S. Pat. No. 6,109,957 discloses a cable drum of this type.

In another embodiment, the output cable on the cable drum is connected with the frequency converter with a compensating cable that is more or less twisted during winding and unwinding of the output cable. For example, the cable drum may be hollow and the compensating cable may be located inside the hollow cylinder of the cable drum. U.S. Pat. No. 5,358,190 discloses a cable drum of this type.

Preferably, the cable drum has a vertical axis of rotation when the converter is positioned in its operating position. The vertical axis of rotation allows the power converter according to the invention to be designed with a cable drum with a large diameter while still keeping the height of the power control housing within desirable limits.

In power converters that are adapted to be suspended below a passenger boarding bridge, it is preferred to provide access to the inside of the converter housing from the bottom of the housing, e.g. by provision of a hatch in the bottom of the housing, for easy maintenance and repair of the power converter. In this way, power converters may be mounted side by side proximate to each other and still provide easy access to interior components of the unit. Further, such units may be serviced without a need to dismount the units from the passenger boarding bridge, or, without the need for a rail system for moving the unit into a position adequate for servicing.

It is further preferred to locate a motor and other drive components for rotation of the cable drum at the bottom of the unit for easy service access.

The output cable may exit the power converter housing through a slot in the housing extending in parallel with the axis of rotation of the cable drum. The power converter may further comprise a guide member that supports a part of the cable proximate to the cable drum exiting or entering the power converter housing whereby successive windings of the output cable will be positioned neatly side by side in abutting relationship, preferably in a single layer, on the cable drum. For example, the guide member may have an opening for feed through of the output cable. Preferably, the guide member is movable along the slot in the housing. The displacement of the guide member along the slot is preferably synchronized with the rotation of the cable drum so that the guide member is located at the area of the cable drum wherein the output cable is being unwound from or wound onto the cable drum, i.e. the rotation of the winding drum and the displacement of the guide member are synchronous. The synchronization may be obtained mechanically, or, electronically using electromotors for rotation of the cable drum and displacement of the guide member, respectively, controlled in synchronism by an electromotor controller.

The power converter may further comprise two cable drums for winding and unwinding of two output cables, each of which is connected to the frequency converter output, whereby the output voltage may be supplied to two separate power sockets.

In a preferred embodiment of the present invention, the power converter further comprises a controller that is adapted to control the frequency converter and that is further adapted for control of the rotation of the cable drum for winding and unwinding of the output cable.

For example, the cable connector may contain push buttons for activation by the power converter user. The push buttons are connected to the controller of the power converter through control conductors contained in the cable. One push button may be pressed to unwind the output cable from the cable drum. Another push button may be pressed to wind the output cable onto the cable drum. Yet another push button may be pressed to apply the output voltage to the aircraft upon connection with the aircraft, and a push button may be pressed to turn the output voltage off before disconnecting the connector from the aircraft. The power converter controller controls the functioning of the push buttons. Further, if the power converter does not receive the interlock signal, the controller will turn the converter off.

The output cable connector may comprise a detector providing a control signal when the connector is engaged with the aircraft socket. The controller may be adapted for controlling turn on of the output voltage in such a way that turn on is inhibited until receipt of the control signal. Further, the control signal may be provided to the passenger boarding bridge controller so that movement of the passenger boarding bridge is inhibited until disconnection of the output cable from the aircraft socket.

A stationary user interface box may also be provided at the passenger boarding bridge for user operation of the power converter. Further, a removable user interface box, e.g. intended for use by a service technician, may be provided for temporary connection with the power converter during performance of a service task.

A system interface for interconnection of the power converter with a remote computer system, e.g. for monitoring of the power converter, invoicing, etc., may be provided.

In an embodiment wherein the cable drum has one set of concentric sliding contacts that rotates with the drum and a corresponding set of respective stationary contact pins that are movable into and out of contact with the respective concentric sliding contacts, the controller may further control movement of the contact pins in such a way that the pins are moved back and out of contact with the sliding contacts when the cable drum rotates and into contact with the sliding contacts when the cable drum has reached a stand still and the operator has pressed a power-on button on the cable connector. When the contact pins have been brought into contact with the sliding contacts, the controller turns the frequency converter output on. When the operator presses the power-off button on the cable connector, the controller sequentially turns off the frequency converter output and moves the contact pins out of contact with the sliding contacts upon which winding of the cable may start. This control scheme ensures that no current flows through the contacts during the connection or disconnection process whereby formation of destructive sparks is eliminated. Further, the contact pins may be forced against the sliding contacts for minimizing contact resistance since the control scheme ensures that contact is only made during standstill of the cable drum.

The controller may further be adapted for lowering the rotational speed of the cable drum before winding the last predetermined length of output cable onto the cable drum. Hereby, excessive swinging of the cable connector when it is hoisted from a ground level to the level of the power converter is substantially avoided.

The controller may further be adapted to keep track of the length of the cable presently unwound from the cable drum and stop rotation of the cable drum when a predetermined maximum length of the output cable has been unwound. Likewise, the controller may be adapted to stop rotation of the cable drum during winding of the cable onto the cable drum when a predetermined maximum length of cable is present on the cable drum. The controller may monitor the length of cable present on the cable drum by monitoring the number of rotations performed by the electromotor rotating the cable drum.

The controller may further be adapted for stopping the rotation of the cable drum if the tension of the output cable exceeds a predetermined tension to ensure personnel health and safety.

The power converter controller may further be adapted for control of various parameters of the power converter in accordance with the current operating conditions, such as the actual load, abrupt load changes, etc., e.g. for provision of a high quality output voltage, etc.

Parameters controlled by the controller may include at least one of the following: individual phase angle of the output voltage, individual phase voltage amplitude, frequency, etc.

Today's aircrafts may comprise significant single-phase loads making the total load of the aircraft asymmetric. Preferably, the frequency converter facilitates individual phase regulation of each of the phases of the output voltage, and the controller is adapted for individual phase regulation of each of the phases of the output voltage so that the voltage output of each of the phases remains substantially independent of the load including asymmetry of the load and asymmetry of the output cable. Such a method is disclosed in U.S. Pat. No. 6,628,014, which is hereby incorporated by reference.

For further improvement of the quality of the voltage output of the power converter according to the present invention, the controller may further be adapted for active suppression of harmonic distortion of the output voltage, e.g. due to a non-linear load.

In a preferred embodiment, the third and fifth harmonic of the voltage output are determined by the controller, and the controller is adapted to control the frequency converter to generate third and fifth harmonics in opposite phase to the determined third and fifth harmonic thereby substantially canceling the third and fifth harmonics of the power converter output voltage.

In a preferred embodiment of the invention, the controller is further adapted for controlling the phase of the frequency converter output for no-break power transfer connection to the load. Typically, in some aircraft on the ground, power supply is transferred from the on-board power generating systems, such as engine driven generators, to the power converter while both systems are running simultaneously for a brief time period. Due to possible phase misalignment between the aircraft and the power converter, the power converter must be able to adjust its output phase to correspond with the on-board generated phase when the connection is actually made, to remain on line throughout the connection process and to provide the proper voltage and frequency to the aircraft while at the same time preventing any failure or damage to either power system. In one embodiment, the output voltage is sensed to determine whether the power converter is leading or lagging with respect to the on-board power. Then the frequency of the inverter is adjusted correspondingly until the phases of the two systems are aligned, preferably within 100 µs, whereby a no-break power transfer is performed.

A similar disconnection process may be performed upon power up of the aircraft on-board power generation system.

Still further, the controller may be adapted for controlling the phase of the frequency converter output for connection in parallel with other power converters.

For example, it has been shown that active power flow between two units coupled in parallel is essentially caused by phase angle differences, while the reactive power flow is essentially caused by voltage amplitude differences. Thus, the controller of the individual power converters may be adapted to adjust the output voltage slightly as a function of the reactive load in such a way that the voltage decreases slightly and within allowable tolerances in response to an increase of the reactive load. Likewise, the individual controllers may be adapted to adjust the output frequency slightly as a function of the active load in such a way that the frequency decreases slightly and within allowable tolerances in response to an increase of the active load. In case that two parallel-coupled units do not share a load equally, the unit supplying the least amount of power will have the highest output voltage and the highest output frequency, and therefore it will try to take over the load, until equal load sharing is obtained.

The power converter according to the present invention has improved performance compared to known units. For example, it is an important advantage of the present invention that the power converter provides a high quality voltage output due to its capability to provide a stable voltage robust against load changes, its capability to individually control of each phase voltage to provide a stable voltage robust against an asymmetric load and asymmetric cables, and its capability of suppressing harmonic distortion of the output voltage, e.g. caused by a non-linear load.

The controller may further be adapted for compensation of the impedance of the output cable for provision of a supply voltage of improved quality at the connection to the load. In this way, the voltage drop of the cable may be compensated by controlled and appropriate increase of the output voltage of the frequency converter. Likewise the phase of the output voltage of the frequency converter may be controlled to compensate for phase changes in the output cable. A method of compensating voltage drop in a multi-conductor cable is disclosed in EP 1 278 284. In the disclosed method, the impedance matrix of the cable is determined by short-circuiting the cable conductor at the remote end of the cable.

The compensation for output cable impedance makes it possible to utilize low cost and asymmetric multi-conductor cables and still provide a supply voltage at the load of the desired quality.

Compared to a conventional separate power supply and a conventional cable drum providing an aircraft on the ground with electrical power, the inventive power converter provides the following significant advantages:

The volume of the power converter is approximately half (60%) the volume of a comparable conventional power supply and cable drum leaving more space available underneath the passenger boarding bridge for other power converters or other equipment.

The weight (e.g. app. 600-700 kg) is less than the sum of the weight of a comparable conventional power supply (e.g. app. 500 kg) and cable drum (e.g. app. 500 kg), because of the common housing, common control circuits, lack of interconnecting cables and connectors, common mounting mechanics, etc. Because of the lowered weight, the mounting position of the unit may be selected more freely.

Because of the lowered volume and weight, the unit may be mounted at a position closer to the aircraft than known units and thus, utilizing a shorter output cable than known units.

The present invention offers advantages, including lowered manufacturing cost. Cost of installment of the unit is lowered since only a single unit has to be mounted and connected. Compensation adjustment for the voltage drop in the output cable may be performed during the manufacture further reducing the commissioning time and eliminating the need for load banks. Service cost is lowered, since only a single unit has to be serviced and service access has been improved.

DRAWINGS

Figure 2:
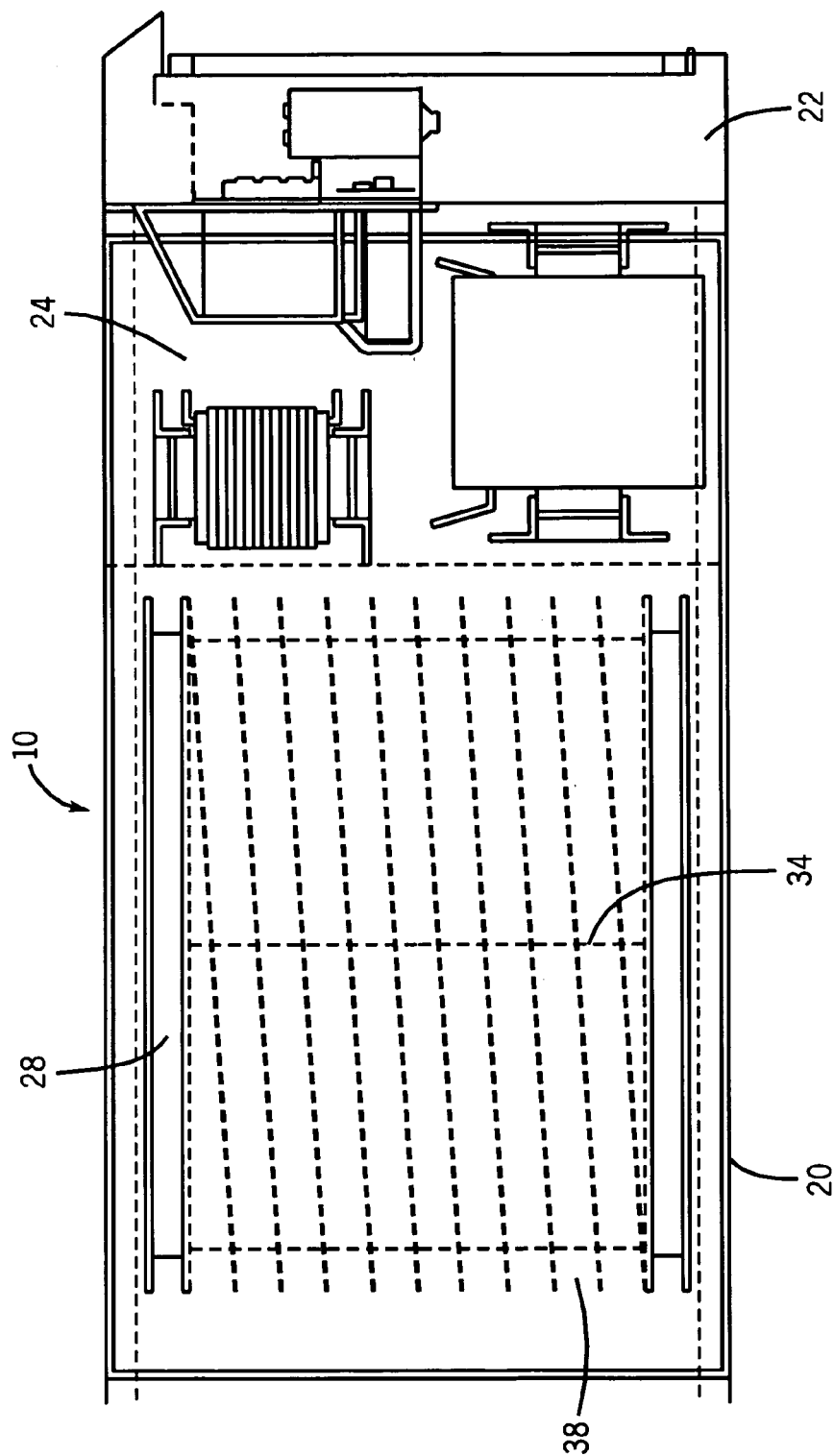
Figure 3:
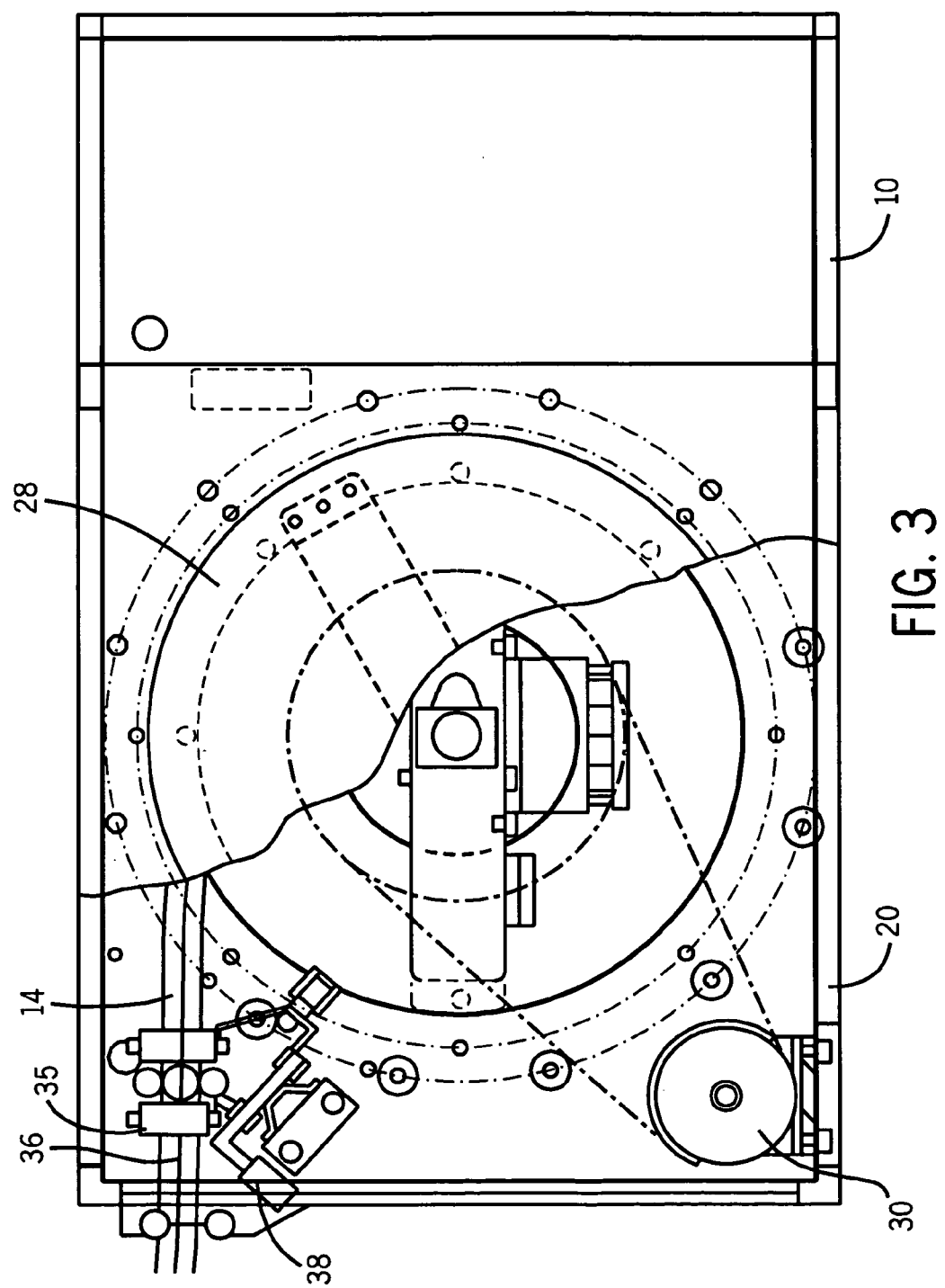
Figure 4:
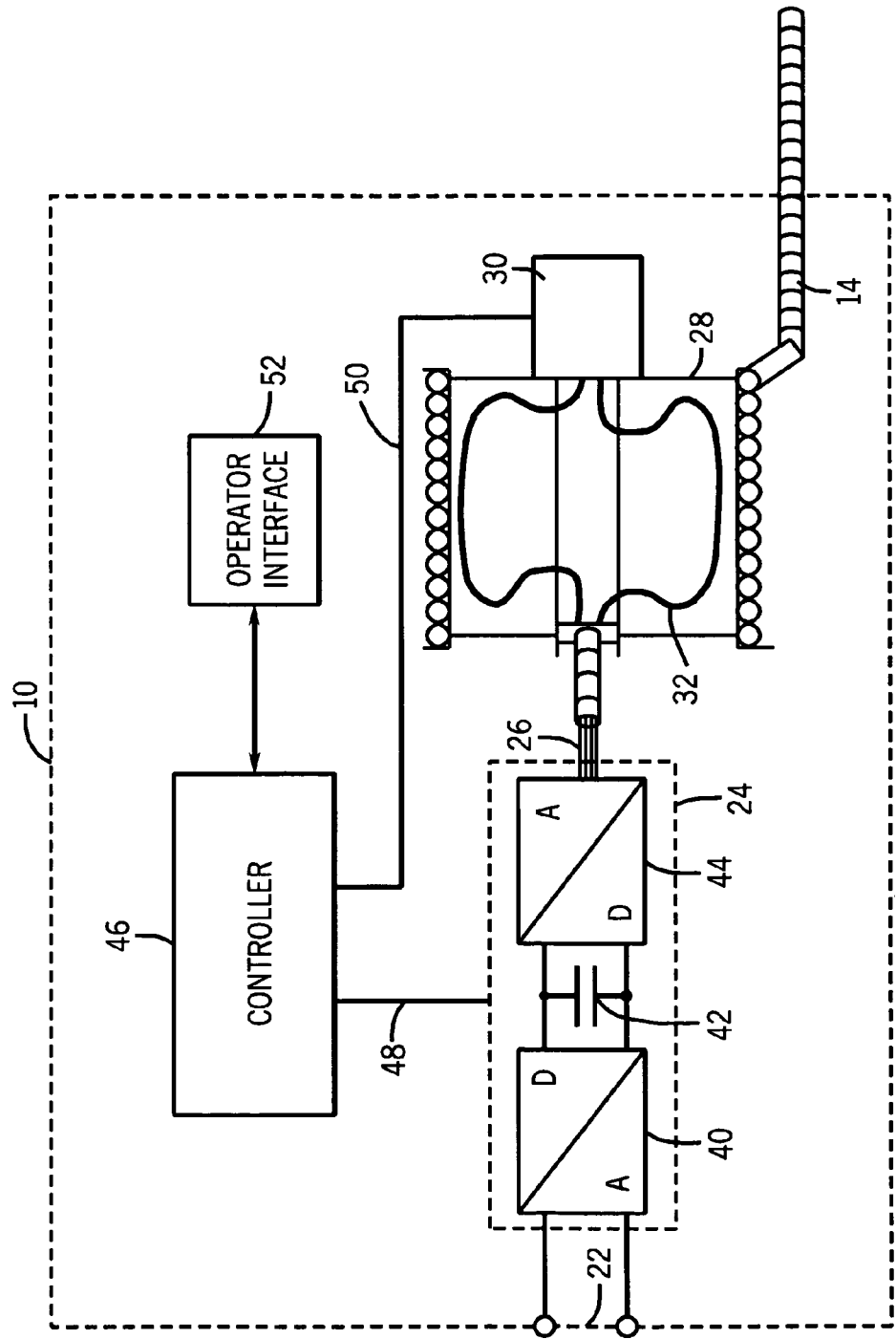
Figure 5:
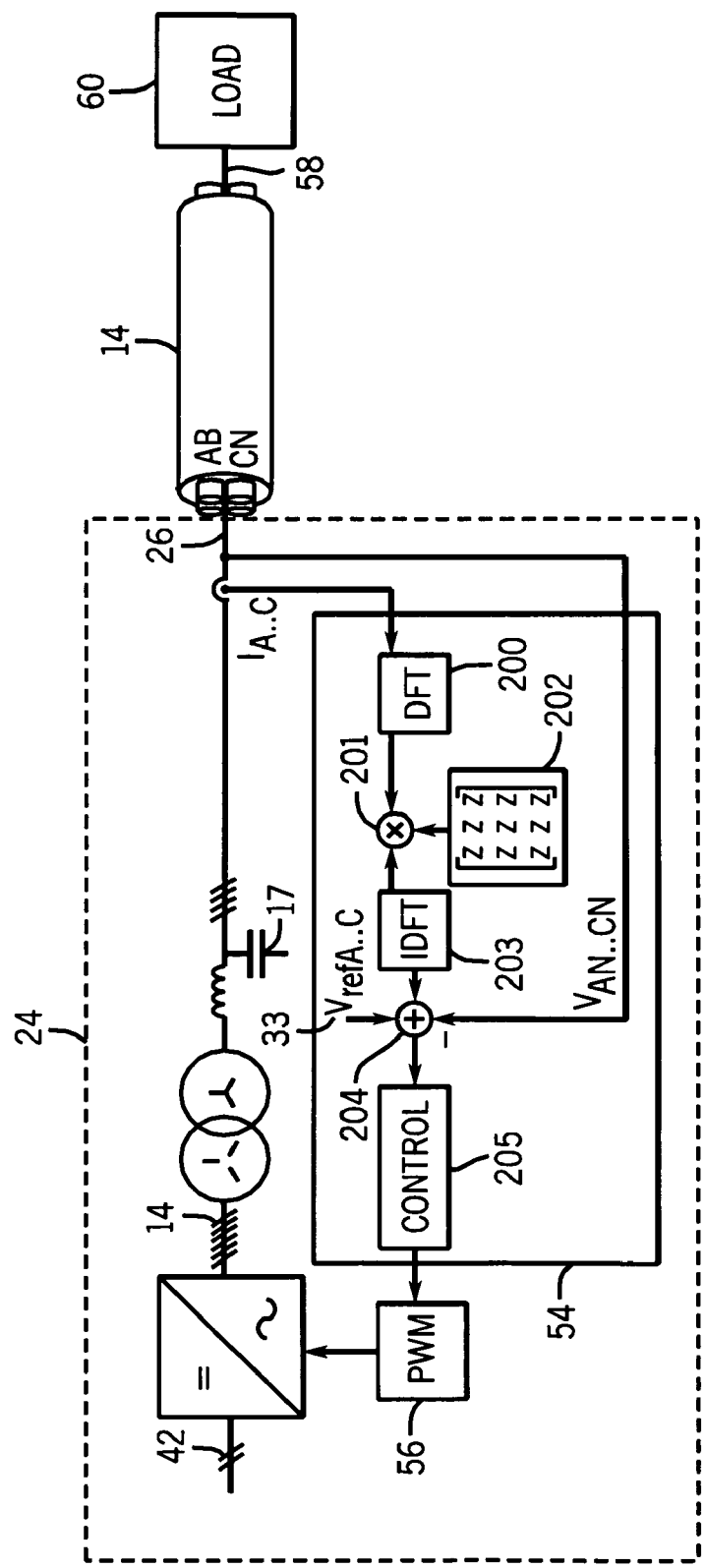
Figure 6:
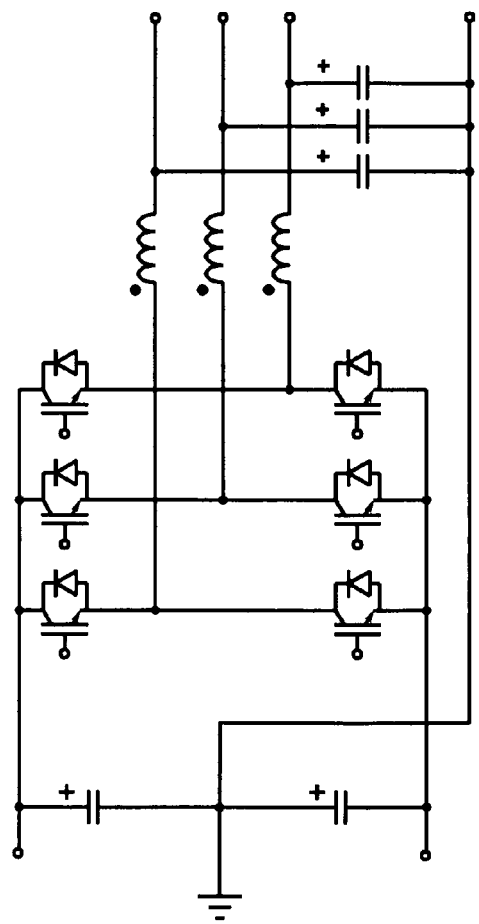
Figure 7:
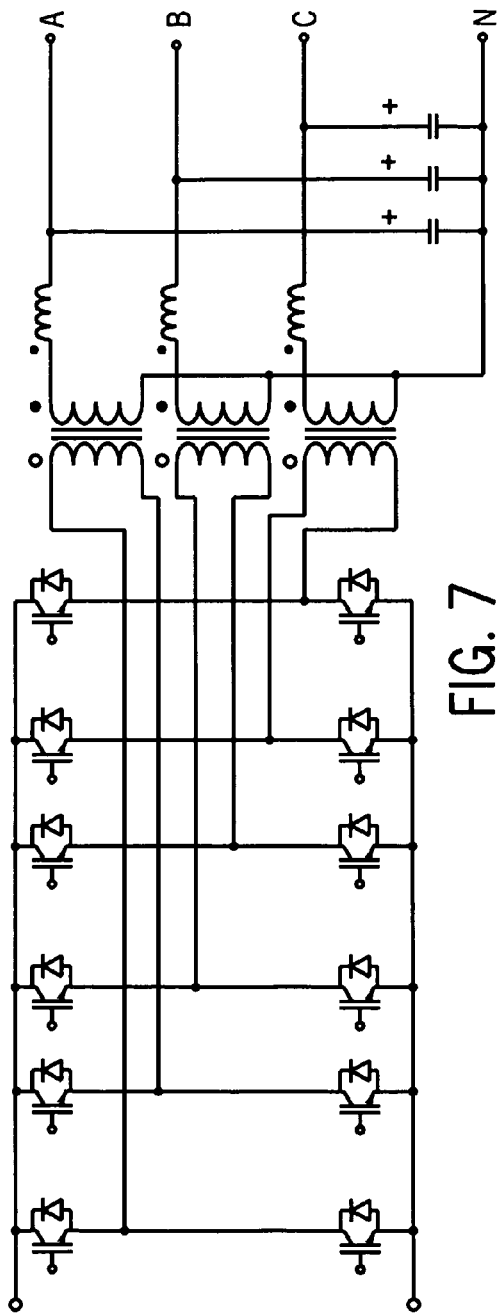
Figure 8:
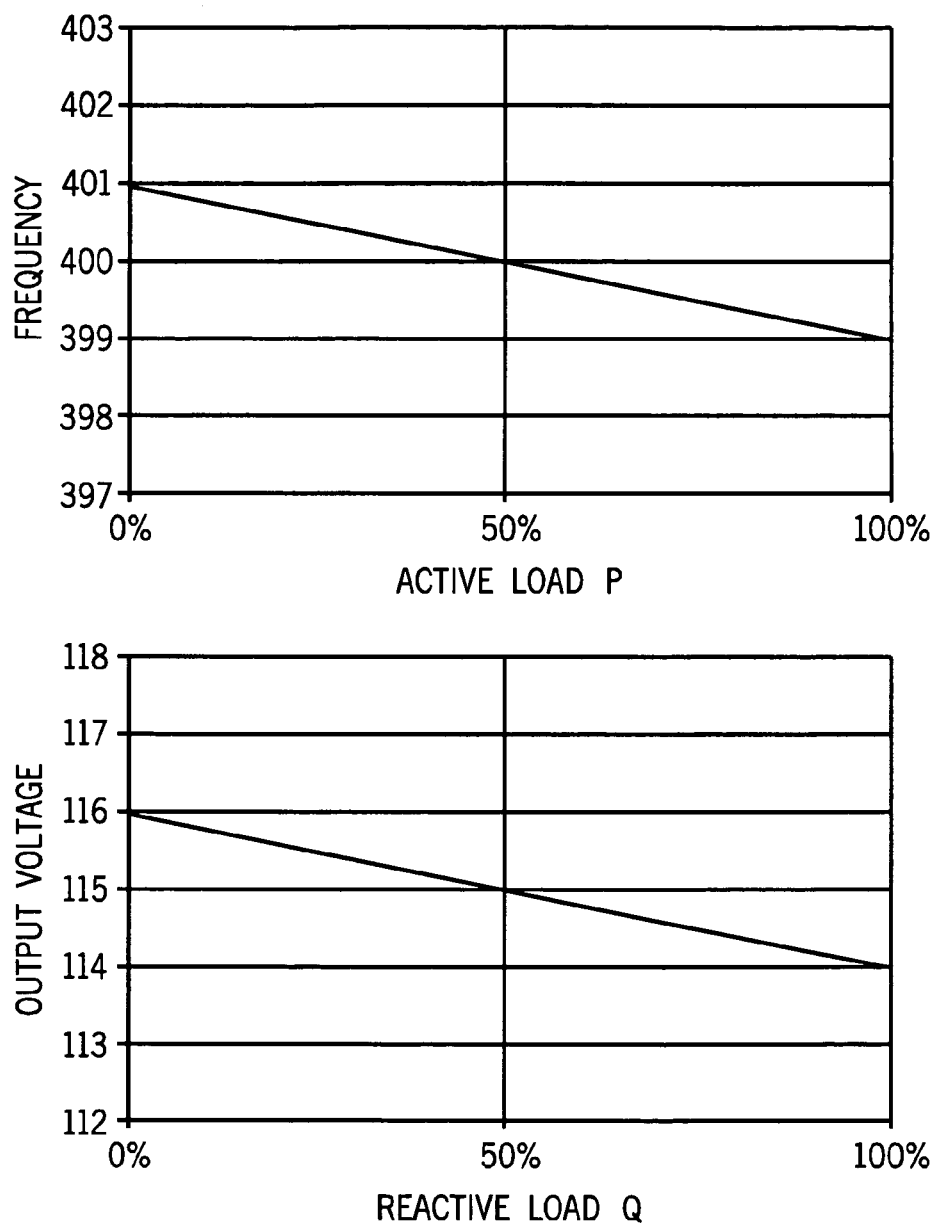

The above and other features and advantages of the present invention will become more apparent to those of ordinary skill in the art by describing in detail exemplary embodiments thereof with reference to the attached drawings in which:

FIG. 1 shows a power converter according to the invention mounted underneath a passenger boarding bridge, FIG. 2 schematically illustrates the positioning of components within an embodiment of the invention viewed from the side, FIG. 3 schematically illustrates the positioning of components within an embodiment of the invention viewed from the bottom, FIG. 4 shows a blocked schematic of a preferred embodiment of the invention, FIG. 5 shows a blocked schematic of the frequency converter, FIG. 6 shows a blocked schematic of the switch circuits of one embodiment of the frequency converter, FIG. 7 shows a blocked schematic of the switch circuits of another embodiment of the frequency converter, and FIG. 8 shows plots of frequency and output voltage as a function of active and reactive load, respectively.

DETAILED DESCRIPTION

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 illustrate a typical mounting position of a power converter 10 according to the present invention, namely underneath a passenger boarding bridge 12. The output cable 14 is shown with a maximum length wound onto the cable drum (not visible) with its connector 16 hanging in a reachable position. The connector has four push buttons, namely wind, unwind, power-on, and power-off. The unit weighs around 700 kg and its dimensions are app. 0.7 m*1.5 m*0.9 m (H*L*W). The cable has a diameter of app. 4 cm and contain in addition to cable conductors for the 400 Hz 3-phase AC power supply a number of conductors for control signals, e.g. interlock and communicating signals from the push buttons to the controller of the power converter. The output cable 14 enters the power converter housing through a vertical slot 18 in the housing.

FIGS. 2-4 schematically illustrate the mechanical positioning of components of an embodiment of the invention. The electrical connections are schematically illustrated in FIG. 4. The illustrated power converter 10 has a housing 20 with an input 22 for a mains voltage of a mains frequency, e.g. 50 Hz, $400//230V_{rms}$, or, 60 Hz, $460V_{rms}$, and enclosing a frequency converter 24 for generation of a stabilized multi-phase alternating output voltage 26, in the illustrate embodiment a 3-phase 400 Hz/$115V_{rms}$ output voltage. The converter 10 is connected with an output cable 14 for supplying the output voltage to a load (not shown). The output cable 14 is wound onto a cable drum 28 enclosed in its housing 20 for winding and unwinding of the output cable 14 for provision of an adjustable length of the output cable as measured between the cable connector 16 and the power converter housing 20.

When the power converter 10 is not in use, the output cable is wound onto the cable drum 28 as shown in FIG. 1. A desired length of the cable 14 is unwound from the cable drum 28 controlled by the operator using the push buttons on the cable connector 16, and the cable connector 16 is inserted in a corresponding receptacle in the aircraft to be connected with the power converter 10. The cable drum 28 is rotated by a motor 30. The output cable 14 on the cable drum 28 is connected with the frequency converter 24 with a compensating cable 32 (shown in FIG. 4) that is more or less twisted during winding and unwinding of the output cable 14. For example, the cable drum 28 may be hollow and the compensating cable 32 may be located inside the hollow cylinder of the cable drum. U.S. Pat. No. 5,358,190 discloses a cable drum of this type.

The cable drum 28 has a vertical axis 34 of rotation when the converter 10 is positioned in its operating position. The vertical axis of rotation 34 allows positioning of the motor 30 and drive components for the cable drum 28 at the bottom of the power converter 10 for easy access from the bottom of the unit 10. A hatch (not shown) is provided in the bottom of the housing 20 for easy maintenance and repair of the power converter. In this way, power converters may be mounted side by side proximate to each other and still provide easy access to interior components of the unit without a need to dismount the units from the passenger boarding bridge, or, without the need for a rail system for moving the unit into a position adequate for servicing.

The power converter 10 also has a guide member 35 that supports a part 36 of the cable 14 proximate to the cable drum 28 exiting or entering the power converter and cable drum housing 20 whereby successive windings 38 of the output cable 14 will be positioned neatly side by side in abutting relationship, preferably in a single layer, on the cable drum 28. The guide member 35 has an opening for feed through of the output cable 14. Preferably, the guide member is movable along the slot in the housing. The displacement of the guide member 35 along the slot 18 is synchronized with the rotation of the cable drum 28 so that the guide member 35 is located at the area of the cable drum 28 wherein the output cable 14 is being unwound from or wound onto the cable drum 28, i.e. the rotation of the cable drum 28 and the displacement of the guide member 35 are synchronous.

The frequency converter 24 comprises a rectifier 40 connected to the mains voltage 22 for provision of a rectified DC voltage 42 to the input of an inverter 44 including a transformer-filter part that generates the desired output voltage 26.

The power converter 10 further comprises a controller 46 that is adapted to control 48 the frequency converter 24 and that is further adapted for control 50 of the rotation of the cable drum 28 for winding and unwinding of the output cable 14.

As already mentioned, the cable connector 16 contains push buttons for activation by the power converter user. The push buttons are connected to the controller 46 of the power converter 10 through control conductors contained in the cable 14. One push button is pressed to unwind the output cable from the cable drum. Another push button is pressed to wind the output cable onto the cable drum. Yet another push button is pressed to apply the output voltage to the aircraft upon connection with the aircraft, and a push button is pressed to turn the output voltage off before disconnecting the connector from the aircraft. The power converter controller 46 controls the functioning of the push buttons.

The controller 46 is adapted for lowering the rotational speed of the cable drum 28 before winding the last predetermined length of output cable 14 onto the cable drum 28. Hereby, excessive swinging of the cable connector 16 when it is hoisted from a ground level to the level of the power converter is substantially avoided.

The controller 46 is further adapted for stopping the rotation of the cable drum 28 if the tension of the output cable exceeds a predetermined tension, e.g. 400 N, to ensure personnel health and safety.

The controller 48 is adapted to keep track of the length of the cable 14 presently unwound from the cable drum 28 and stop rotation of the cable drum 28 when a predetermined maximum length of the output cable 14 has been unwound. Likewise, the controller 48 may be adapted to stop rotation of the cable drum 28 during winding of the cable 14 onto the cable drum 28 when a predetermined maximum length of cable 14 is present on the cable drum 28. The controller 46 monitors the length of cable 14 present on the cable drum 28 by monitoring the number of rotations performed by the electromotor 30 rotating the cable drum 28.

The power converter controller 46 is also adapted for control of various parameters of the power converter 24 in accordance with the current operating conditions, such as the actual load, abrupt load changes, etc., e.g. for provision of a high quality output voltage.

Parameters controlled by the controller may include at least one of the following: individual phase angle of the output voltage, individual phase voltage amplitude, frequency, etc.

The controller 46 is connected to an operator interface 52 with push buttons, lamps and displays for inputting operator commands to the unit and for displaying various states of the power converter to the operator.

For power converter management, the controller 46 has at least one control output 48 for control of the frequency converter 24, such as switch frequency, and a control output 50 for control of rotation of the cable drum 28. Further, the controller 46 is capable of controlling the phase angle of the output 26, and of individually controlling each of the output voltages of the output phases 26.

FIG. 5 schematically illustrates the frequency converter 24 in more detail. The controller 46 includes control circuitry 54, 56 at the frequency converter 24 adapted for compensation of the impedance of the output cable for provision of a supply voltage 58 of improved quality at the connection to the load 60. In this way, the voltage drop of the cable 14 may be compensated by controlled and appropriate increase of the output voltage 26 of the frequency converter 24. Likewise the phase of the output voltage 26 of the frequency converter 24 may be controlled to compensate for phase changes in the output cable 14. A method of compensating voltage drop in a multi-conductor cable is disclosed in EP 1 278 284. Present FIG. 5 corresponds to FIG. 1 of EP 1 278 284. Reference is made to the corresponding part of the description of EP 1 278 284. In the disclosed method, the impedance matrix of the cable 14 is determined by short-circuiting the cable conductor at the remote end of the cable. The determined matrix 202 is stored in control circuitry 54.

The compensation for output cable impedance makes it possible to utilize low cost asymmetric multi-conductor cables and still provide a supply voltage 58 at the load 60 of the desired quality.

FIGS. 7 and 8 schematically illustrate two circuit topologies of the frequency converter 24. The circuit topology is selected so that the individual phase outputs of the frequency converter are controllable independent of the other phase outputs. Thus, the most common inverter topologies with star coupled or triangular coupled 3-phase transformers cannot be used, because of the absence of a physical neutral. In such couplings an asymmetric load will cause the three phases of the output voltage to become correspondingly asymmetric. In the embodiment shown in FIG. 6, a centre tap is provided from the DC voltage generated by the rectifier 40, and the switches generating the 400 Hz alternating output voltage are arranged for individual control of the output voltage of each of the output phases by proper pulse width modulation of the switches as is well known in the art. In an alternative topology shown in FIG. 7, twelve switches are arranged in three H-bridges connected to the DC voltage without a centre tap for provision of individually controllable output phase voltages. As shown in FIG. 7, the H-bridge topology requires a transformer.

Still further, the controller is adapted for controlling the phase of the frequency converter output for synchronization with other power converters.

In the illustrated embodiment, simply parallel coupling of the outputs of the power converters performs the synchronization. It has been shown that active power flow between two units coupled in parallel is essentially caused by phase angle differences, while the reactive power flow is essentially caused by voltage amplitude differences. Thus, as shown in FIG. 8, in the illustrated embodiment, the controller 46 is adapted to adjust the output voltage slightly as a function of the reactive load in such a way that the voltage decreases slightly and within allowable tolerances in response to an increase of the reactive load. Likewise, the controller is adapted to adjust the output frequency slightly as a function of the active load in such a way that the frequency decreases slightly and within allowable tolerances in response to an increase of the active load. In case that two parallel-coupled units do not share a load equally, the unit supplying the least amount of power will have the highest output voltage and the highest output frequency, and therefore it will try to take over the load, until equal load sharing is obtained.

The invention claimed is:

1. A power converter comprising:
a housing with an input for a main voltage of a main frequency and enclosing:
a frequency converter for generation of a stabilized multi-phase alternating output voltage and connected to an output cable for supplying the output voltage to a load; and
a component holding the output cable, the housing providing an adjustable length of the output cable allowing a variable distance between the load and the converter.

2. A power converter according to claim 1, wherein the component comprises a cable drum for winding and unwinding of the output cable for provision of the adjustable length.

3. A power converter according to claim 2, wherein the cable drum has a vertical axis of rotation when the converter is positioned in its operating position.

4. A power converter according to claim 2, further comprising a motor for rotation of the cable drum for winding of the output cable.

5. A power converter according to claim 4, wherein the motor is further adapted for rotation of the cable drum for unwinding of the output cable.

6. A power converter according to claim 2, further comprising a guide member that supports a part of the cable proximate to the cable drum and that is movable in parallel with the axis of rotation of the cable drum.

7. A power converter according to claim 4, further comprising a controller that is adapted to control the frequency converter and that is further adapted for control of the winding and unwinding of the output cable.

8. A power converter according to claim 7, wherein the controller is further adapted for lowering the rotational speed of the cable drum before winding the last predetermined length of output cable onto the cable drum.

9. A power converter according to claim 7, comprising output cable connectors, wherein the output cable connectors further comprise a user panel for generation of control signals to the controller in response to respective user inputs.

10. A power converter according to claim 7, wherein the controller is further adapted for individual phase regulation of each of the phases of the output voltage.

11. A power converter according to claim 7, wherein the controller is further adapted for active suppression of harmonic distortion of the output voltage.

12. A power converter according to claim 7, wherein the controller is further adapted for controlling the phase of the frequency converter output for no-break power transfer connection to the load.

13. A power converter according to claim 7, wherein the controller is further adapted for controlling the voltage amplitude and the frequency output for connection of the unit in parallel with other power converters.

14. A power converter according to claim 7, wherein the controller is further adapted for compensation of the output cable voltage drop.

15. A power converter according to claim 7, wherein the controller is further adapted for compensation of the output cable impedance.

16. A power converter according to claim 14, wherein the output cable impedance is determined during manufacture and stored in the controller for compensation of the impedance during operation of the power converter.

17. A power converter according to claim 1, further comprising two cable drums for winding and unwinding of two output cables, each of which is connected to the frequency converter output for supplying the output voltage to a respective load.

* * * * *